(12) United States Patent
Benvenuto et al.

(10) Patent No.: US 9,646,248 B1
(45) Date of Patent: May 9, 2017

(54) MAPPING ACROSS DOMAINS TO EXTRACT CONCEPTUAL KNOWLEDGE REPRESENTATION FROM NEURAL SYSTEMS

(71) Applicant: HRL Laboratories, LLC, Malibu, CA (US)

(72) Inventors: James Benvenuto, Beverly Hills, CA (US); Rajan Bhattacharyya, Sherman Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 414 days.

(21) Appl. No.: 14/489,313

(22) Filed: Sep. 17, 2014

Related U.S. Application Data

(60) Provisional application No. 62/028,083, filed on Jul. 23, 2014.

(51) Int. Cl.
| | |
|---|---|
| *G06F 15/18* | (2006.01) |
| *G06N 3/02* | (2006.01) |
| *G06N 5/02* | (2006.01) |
| *G06N 99/00* | (2010.01) |
| *G06N 3/08* | (2006.01) |

(52) U.S. Cl.
CPC ............ *G06N 5/022* (2013.01); *G06N 3/08* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 8,204,623 B1* | 6/2012 | Bhattacharyya | ....... | B25J 9/1666 700/1 |
| 8,285,052 B1* | 10/2012 | Bhattacharyya | .. | G06F 17/30247 382/190 |
| 8,406,989 B1* | 3/2013 | Bhattacharyya | ....... | B25J 9/1666 345/474 |
| 8,699,767 B1* | 4/2014 | Khosla | ............... | G06K 9/00496 382/128 |

(Continued)

OTHER PUBLICATIONS

Ganter, B. & Willie, R. (1998).Formal Concept Analysis: Mathematical Foundations. Springer-Verlag, Chapter 1, pp. 16-62.

(Continued)

*Primary Examiner* — Paulinho E Smith
(74) *Attorney, Agent, or Firm* — Tope-McKay & Associates

(57) ABSTRACT

Described is system for extracting conceptual knowledge representation from neural system. The system extracts a first set of attributes to define a set of objects in a first domain. A first formal concept lattice is constructed comprising the set of objects and the first set of attributes from the first domain. A second set of attributes is extracted to define the set of objects in a second domain. A second formal concept lattice is constructed comprising the set of objects and the second set of attributes from the second domain. The first formal concept lattice is aligned with the second formal concept lattice to link the first set of attributes with the second set of attributes, wherein a combined lattice is generated. The combined lattice is used to relate the first domain to the second domain.

19 Claims, 16 Drawing Sheets

(56) References Cited

U.S. PATENT DOCUMENTS 8,990,139 B1 * 3/2015 Howard ............... G06Q 10/101
   706/46
9,002,762 B1 * 4/2015 Howard ................... G06N 3/02
   706/20

OTHER PUBLICATIONS

Carpineto, C. & Romano, G. (2004). Concept Data Analysis: Theory and Applications. Wiley, Chapter 2, pp. 25-77.
Carpineto, C. & Romano, G. (2004). Concept Data Analysis: Theory and Applications. Wiley, Chapter 3, pp. 83-104.
Endres, D., Foldiak, P., Priss, U. (2010), An application of formal concept analysis to semantic neural decoding. Annals of Mathematics and Artificial Intelligence 57(3-4), 233-248.
Endres, D., Adam, R., Giese, M.A. & Noppeney, U. (2012). Understanding the Semantic Structure of Human fMRI Brain Recording with Formal Concept Analysis. Formal Concept Analysis—10th International Conference, ICFCA 2012, Leuven, Belgium, May 7-10, 2012. Proceedings: 96-111.
Lotte, F., Congedo, M , Lécuyer, A., Lamarche, F., & Arnaldi, B. (2007). A review of classification algorithms for EEG-based brain—computer interfaces. Journal of neural engineering, 4.
Mourao-Miranda, J., Friston, K. J., & Brammer, M. (2007). Dynamic discrimination analysis: a spatial-temporal SVM. NeuroImage. 36(1), 88.
Naselaris, T., Kay, K. N., Nishimoto, S., & Gallant, J. L. (2011). Encoding and decoding in fMRI. Neuroimage. 56(2). 400-410.
Pereira, F., Detre, G., & Botvinick, M. (2011). Generating text from functional brain images. Frontiers in human neuroscience, 5.
Landauer, T.K., Foltz, P.W., & Lahm, D. (1998). Introduction to Latent Semantic Analysis. Discourse Processes, 25, 259-284.

* cited by examiner

FIG. 4

|  | Size small (ss) | Size medium (sm) | Size large (sl) | Distance near (dn) | Distance far (df) | Moon (my) | No moon (nm) |
| --- | --- | --- | --- | --- | --- | --- | --- |
| Mercury | X |  |  | X |  |  | X |
| Venus | X |  |  | X |  |  | X |
| Earth | X |  |  | X |  | X |  |
| Mars | X |  |  | X |  | X |  |
| Jupiter |  |  | X |  | X | X |  |
| Saturn |  |  | X |  | X | X |  |
| Uranus |  | X |  |  | X | X |  |
| Neptune |  | X |  |  | X | X |  |
| Pluto | X |  |  |  | X | X |  |

FIG. 5A

|      | S1 | S2 | S3 | S4 | S5 | S6 | S7 | S8 | S9 | S10 |
|------|----|----|----|----|----|----|----|----|----|-----|
| OMb  |    |    |    |    |    |    |    |    |    | x   |
| OT   |    |    |    |    |    |    |    |    | x  |     |
| OCan |    |    |    |    |    |    |    | x  |    |     |
| ODo  |    |    |    |    |    |    | x  |    |    |     |
| OM   |    |    |    |    | x  |    |    |    |    |     |
| ODi  |    |    |    | x  |    |    |    |    |    |     |
| OCar |    | x  |    |    |    | x  |    |    |    |     |
| OP   | x  |    | x  |    |    |    |    |    |    |     |
| VH   |    |    |    |    |    |    |    | x  |    |     |
| VM   |    |    | x  |    |    | x  |    |    |    |     |
| VA   |    |    |    | x  | x  |    |    |    |    |     |
| VD   |    | x  |    |    |    | x  |    |    | x  | x   |
| VO   | x  |    |    |    |    |    |    |    |    |     |
| SP   |    |    |    |    |    | x  | x  | x  | x  |     |
| SC   |    |    |    |    | x  |    |    |    |    |     |
| SD   | x  | x  | x  | x  |    |    |    |    |    | x   |

FIG. 7A

|     | ATC | IT1 | STS | PFC | ACC | PC | BNS | AMY | IT2 |
| --- | --- | --- | --- | --- | --- | --- | --- | --- | --- |
| S1  | X   |     | X   |     |     |    |     | X   |     |
| S2  |     | X   | X   |     |     | X  |     |     |     |
| S3  | X   |     | X   | X   |     |    |     |     |     |
| S4  |     | X   | X   |     |     |    | X   |     |     |
| S5  | X   |     |     |     |     |    | X   |     | X   |
| S6  |     | X   | X   | X   |     | X  |     |     |     |
| S7  | X   |     | X   |     |     |    |     |     |     |
| S8  |     | X   | X   |     | X   |    |     |     |     |
| S9  |     | X   | X   |     |     | X  |     |     |     |
| S10 |     | X   | X   |     |     | X  |     |     |     |

FIG. 8A

| | |
|---|---|
| 1. | BNS activity → Eating |
| 2. | PC activity → Driving |
| 3. | PFC activity → Meeting |
| 4. | The verb HAS → ACC, IT, STS activity |
| 5. | The verb MET → ATC, PFC, STS activity |
| 6. | Doctor Eating → BNS, IT, STS activity |
| 7. | Doctor Driving → IT, PC, STS activity |

FIG. 12

MAPPING ACROSS DOMAINS TO EXTRACT CONCEPTUAL KNOWLEDGE REPRESENTATION FROM NEURAL SYSTEMS

CROSS-REFERENCE TO RELATED APPLICATIONS

This is a Non-Provisional patent application of U.S. Provisional Application No. 62/028,083, filed in the United States on Jul. 23, 2014, entitled, "Mapping Across Domains to Extract Conceptual Knowledge Representation from Neural Systems."

FIELD OF INVENTION

The present invention relates to a system for extracting conceptual knowledge representation from neural systems and, more particularly, to a system for extracting conceptual knowledge representation from neural systems by mapping across domains.

BACKGROUND OF THE INVENTION

Many forms of information can be described as a set of objects, each with a set of attributes and/or values. In these cases, any hierarchical structure remains implicit. Often the set of objects can be related to two or more completely different domains of attributes and/or values. Formal Concept Analysis (FCA) is a principled way of deriving a partial order on a set of objects each defined by a set of attributes. It is a technique in data and knowledge processing that has applications in data visualization, data mining, information retrieval, and knowledge management (see the List of Incorporated Cited Literature References, Literature Reference No. 2). The principle with which it organizes data is a partial order induced by an inclusion relation between object's attributes. Additionally, FCA admits rule mining from structured data.

Neural decoding is a neuroscience-related field concerned with the reconstruction of sensory and other stimuli from information that has already been encoded and represented in the brain by networks of neurons. Prior art in methods for neural decoding have used machine learning algorithms for classification. Examples include support vector machines for electroencephalography (EEG) and functional magnetic resonance imaging (fMRI) (see Literature Reference No. 6). Neural decoding methods that don't specifically classify but parameterize data in the stimulus domain include multivariate parametric analysis, of which a common subset is regression methods. Prominent examples of the state-of-the-art using regression methods are in fMRI (see Literature Reference No. 7). This prior art treats each voxel (fMRI blood-oxygen-level-dependent (BOLD)) independently and parameterizes its response according to variables (stimulus space) defined a priori. In essence, any structure in the neural data can only relate directly to the explicit structure as defined in the variables a priori, forming an activation map for these variables. Thus, hierarchical relationships implicit in the neural data in a regression framework are treated as independent variables (i.e., flat), even if the stimulus variables have explicit hierarchy. Other prior art takes words from a corpus of articles to produce topics from statistical distributions of words; however, it also flattens any hierarchies by simply regressing the neural data onto topics (see Literature Reference No. 8).

Thus, a continuing need exists for a system that seeks to first discover hierarchical structure in the neural data, and relate it to structure in the variables, or stimulus space.

SUMMARY OF THE INVENTION

The present invention relates to a system for extracting conceptual knowledge representation from neural systems and, more particularly, to a system for extracting conceptual knowledge representation from neural systems by mapping across domains. The system comprises one or more processors and a memory having instructions such that when the instructions are executed, the one or more processors perform multiple operations. The system extracts a first set of attributes to define a set of objects in a first domain. A first formal concept lattice is constructed comprising the set of objects and the first set of attributes from the first domain. A second set of attributes is extracted to define the set of objects in a second domain. A second formal concept lattice comprising the set of objects and the second set of attributes from the second domain is constructed. The first formal concept lattice is aligned using lattice apposition with the second formal concept lattice to link the first set of attributes with the second set of attributes, wherein a combined lattice is generated. The combined lattice is used to relate the first domain to the second domain.

In another aspect, the set of objects is presented to a human subject as a set of stimuli, and a set of neural signals from the human subject is measured during the presentation of the set of objects, wherein the set of neural signals represents the second set of attributes.

In another aspect, the first domain is a semantic domain and the second domain is a neural domain.

In another aspect, the set of objects in the neural domain is defined using a definition of the set of objects in the semantic domain.

In another aspect, the system uses the combined lattice to denoise at least one attribute in the first or second sets of attributes, wherein the at least one attribute is a candidate for removal if it is found in one of the first or second formal concept lattices but not the other formal concept lattice.

In another aspect, the system comprises an autonomous robot for extracting conceptual knowledge representation from neural systems, the autonomous robot comprising at least one onboard sensor, the at least one onboard sensor operable for sensing a set of objects in at least one domain; and one or more processors and a non-transitory computer-readable medium having executable instructions encoded thereon such that when executed, the one or more processors perform multiple operations. The autonomous robot extracts a first set of attributes to define a set of objects in a first domain. A first formal concept lattice is constructed comprising the set of objects and the first set of attributes from the first domain. A second set of attributes is extracted to define the set of objects in a second domain. A second formal concept lattice comprising the set of objects and the second set of attributes from the second domain is constructed. The first formal concept lattice is aligned using lattice apposition with the second formal concept lattice to link the first set of attributes with the second set of attributes, wherein a combined lattice is generated. The combined lattice is used to relate the first domain to the second domain.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4 illustrates a concept represented within a cross table as a contiguous block of X's according to the principles of the present invention;

FIG. 5A illustrates a cross table containing information about the planets according to the principles of the present invention;

FIG. 7A illustrates a linguistic context for the linguistic domain according to the principles of the present invention;

FIG. 8A illustrates a neural context for the neural domain according to the principles of the present invention;

FIG. 12 illustrates implications derivable from the combined lattice in FIG. 11.

DETAILED DESCRIPTION

Figure 1:
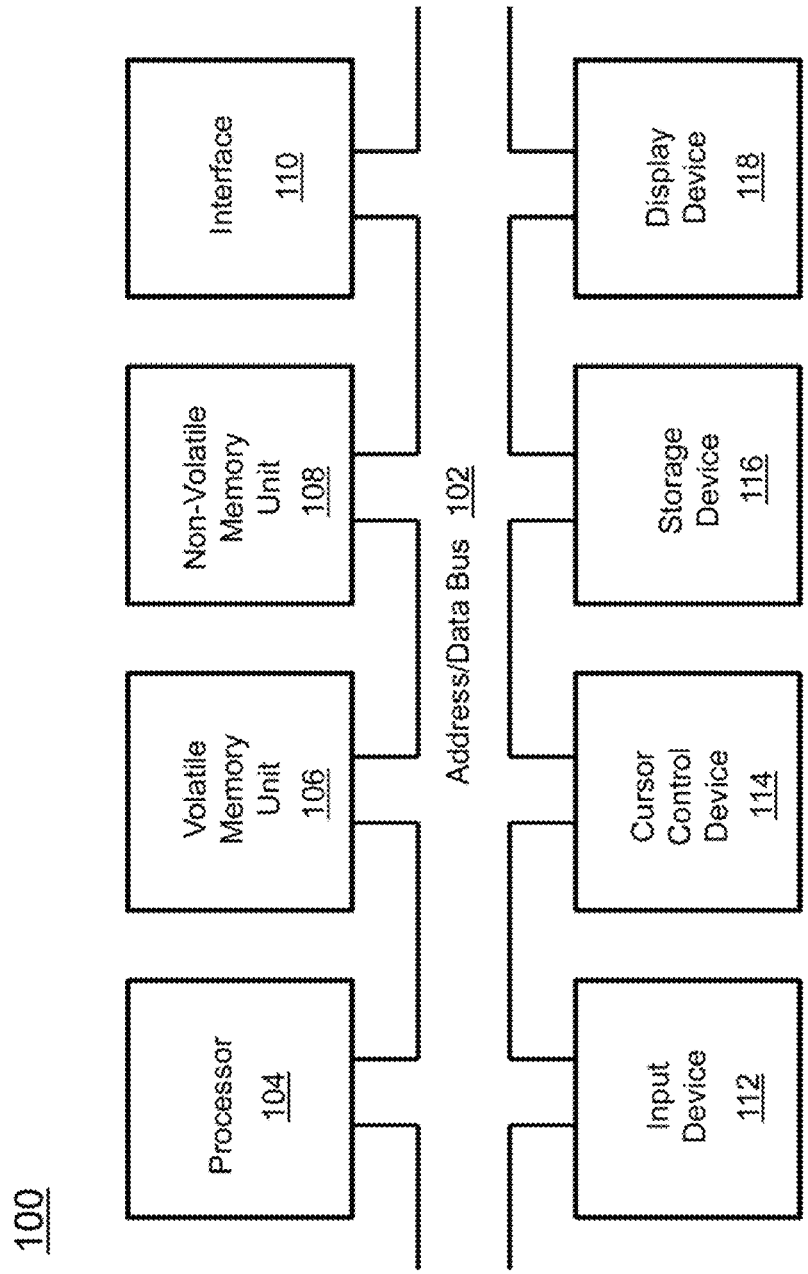
FIG. 1 is a block diagram depicting the components of a system for extracting conceptual knowledge from neural systems according to the principles of the present invention.

The present invention relates to a system for extracting conceptual knowledge representation from neural systems and, more particularly, to a system for extracting conceptual knowledge representation from neural systems by mapping across domains. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification. (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Ganter, B. & Wille, R. (1998). Formal Concept Analysis: Mathematical Foundations. Springer-Verlag.
2. Carpineto, C. & Romano, G. (2004). Concept Data Analysis: Theory and Applications. Wiley.
3. Endres, D., Foldiak. P., Priss, U. (2010), An application of formal concept analysis to semantic neural decoding. Annals of Mathematics and Artificial Intelligence 57(3-4), 233-248.
4. Endres, D., Adam, R., Giese, M. A. & Noppeney, U. (2012). Understanding the Semantic Structure of Human fMRI Brain Recording with Formal Concept Analysis. Formal Concept Analysis—10th International Conference, ICFCA 2012, Leuven, Belgium, May 7-10, 2012. Proceedings: 96-111.

5. Lotte, F., Congedo, M., Lécuyer, A., Lamarche, F., & Arnaldi, B. (2007). A review of classification algorithms for EEG-based brain—computer interfaces. Journal of neural engineering, 4.
6. Mourao-Miranda, J., Friston, K. J., & Brammer, M. (2007). Dynamic discrimination analysis: a spatial-temporal SVM. NeuroImage, 36(1), 88.
7. Naselaris, T., Kay, K. N., Nishimoto, S., & Gallant, J. L. (2011). Encoding and decoding in fMRI. Neuroimage, 56(2), 400-410.
8. Pereira, F., Detre, G., & Botvinick, M. (2011). Generating text from functional brain images. Frontiers in human neuroscience, 5.
9. Landauer, T. K., Foltz, P. W., & Lahm, D. (1998). Introduction to Latent Semantic Analysis. Discourse Processes, 25, 259-284.

(2) Principal Aspects

The present invention has three "principal" aspects. The first is a system for extracting conceptual knowledge representation from neural systems. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment.

Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
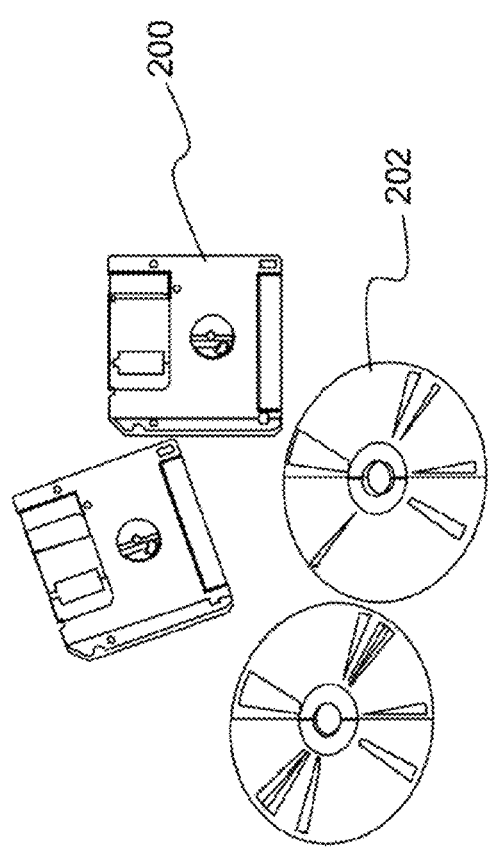
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of the Invention

Described is a method to extract hierarchical content from different domains and relate them. It does not matter if the domains are continuous or discrete, or a mixture of each. The two domains must be initially related by a common set of objects, but the definition or defining sets of attributes for the objects can be completely different in each of the domains. The method according to the principles of the present invention may be applied to any number of different domains and may be applied in a batch manner or using an on-line algorithm. The method can have a fixed definition of the objects in each domain, or can be used to define the definition of the objects in a domain, given that the description of the other domain is considered "ground truth". In addition, the present invention separates out what components are noise from what define the hierarchical structure. The invention described herein leverages formal concept analysis (FCA) to extract the hierarchy of the domains given a set of objects and their attributes. Furthermore, using machine learning techniques, the two domains can be bridged, and the structure of one mapped onto the other.

Many forms of information can be described as a set of objects each with a set of attributes and/or values. In these cases, any hierarchical structure remains implicit. Often the set of objects can be related to two or more completely different domains of attributes and/or values. The present invention allows the discovery of the relationships between the implicit structures in different domains. An example of this is that a given set of words or sentences can be related to a semantic content, such as an IS-A hierarchy and/or a HAS-A relationship. An IS-A hierarchy describes a hierarchy where the elements are related by category, such as a dog IS-A canine IS-A mammal IS-A animal IS-A living-thing IS-A entity. HAS-A is similar except the hierarchy is based on having instead of a category, such as a car HAS-A wheel which HAS-A rim which HAS-A lug-nuts. These same set of words or sentences can be related to neural activity, such as electroencephalography (EEG) or functional magnetic resonance imaging (fMRI) blood-oxygen-level dependent (BOLD) response upon presentation of the concept as a stimulus. These two areas (semantic content and neural activity) have completely different structure and information content and yet are, in some way, related. Traditional methods of fMRI data analysis use regression or machine learning techniques to predict activity from stimulus, or visa-versa, but leave the structure of the mapping unclear or haphazard.

The invention described herein supplies a way to bridge these disparate domains, such that the structure of one can inform the other. In some cases, the structure of one can be defined to have a clear ontological structure (such as a WordNet® ontology), and the other can have no apparent structure. Using the present invention, the data in the unstructured domain can be induced to some degree to conform (through induced structure on the values or attributes) to the structure of the structured domain, thereby coming to understand the unstructured domain better. This obtained mapping can then be leveraged to be able to extract semantic content from only neural signals.

There is a technique to extract hierarchical or ontological structure on fMRI BOLD responses (see Literature Reference Nos. 3 and 4), but this structure is unsupervised and does not allow a way to fit the fMRI BOLD responses onto a known structure. In addition to relating two domains, the system according to the principles of the present invention can relate any number of domains, where not only can the domains be structured according to a "ground truth" domain, but the various other domains can be related to each other. Consequently, given some semantic domain used as "ground truth", both fMRI and EEG signals can not only be mapped to the semantic domain, but now also may be related to each other.

The present invention can be a component of any system which needs to extract semantic content according to a pre-defined structure from a domain which lacks any apparent structure. The neural domains for relating a discovered implicit structure to a known structure can come from any number of signals, such as fMRI BOLD, EEG, functional near-infrared spectroscopy (fNIRS), and magnetoencephalography (MEG). The data from these initially unstructured neural domains are often continuous and without apparent borders, while the desired structural classification has clear borders and is hierarchical. The present invention can show which apparently disparate elements or value ranges contribute to defining discrete and hierarchical structure.

Mapping structured knowledge onto neural data domains is not limited to the concepts described above. Another possible application of the present invention is decoding EEG signals for intent. The EEG signals can be structured into a hierarchy and used as features in a classifier trying to detect "thought" commands or responses. Another non-limiting application area is human subject training and learning. EEG systems have been used to infer performance in the human brain during instruction through decoding of secondary signals, such as level of attention and working memory load. The system according to the principles of the present invention can be used to discover whether the explicit knowledge during instruction is related to the structure of neural signals, such as the spatiotemporal patterns in EEG. The decoding of neural signals in general, whether for intent or performance monitoring, is of interest in order to augment human machine interfaces. For instance, the invention could be used for new neural decoding methods for vehicle operators (e.g., drivers) and pilots.

Autonomous systems, such as robots, are another application area that can benefit from the present invention. Any system that must perceive the environment and construct an understanding can benefit from the invention described herein. The system according to the principles of the present invention allows a flat collection of perceived responses to be transformed into a hierarchically structured discrete representation. This structuring into an ontology will facilitate understanding. The ontology can be used by an autonomous system to reason about data from the environment to discover the causes of observations (i.e., causal reasoning). This reasoning capability is useful for systems, especially when data are sparse, noisy, or uncertain, to allow the system an additional advantage of using the ontology for perception. The composition is unsupervised and derived from the structure of the co-domain. The system can be composed to cascade multiple levels of information into higher and higher levels of organization. One skilled in the art can use this invention to compose receptive field responses into higher and higher levels of object composition and, hence, object recognition. Further, causal reasoning capabilities that result from learning ontology using the present invention can allow autonomous systems to understand the consequence of actions and allow intelligent action selection. It can also be an important component in a classification system.

Information processing systems are another application area that can benefit from the invention described herein. Neural networks learn to perform classification by learning the weights necessary to create an input/output mapping. The weights comprise the implicit learned structure of the data domain. The present invention can apply implicit hierarchical structure onto the training of neural networks to augment their learning and enhance performance. After learning, the system can also be used to understand the implicit learned structure from the weights (or activations from units) and map it to an explicitly structured domain, such as knowledge about the output classification (e.g., concept or object hierarchy).

At an abstract level the invention described herein performs a form of machine learning. Typical forms of machine learning are used to learn a mapping or a discriminating hyper-plane for classifying objects into one of a discrete set of classes, usually two. Although the technique works well, there is no way to extract a clear meaning to the decision boundary. In the case of the present invention, the structure of the decision boundary is explicitly created and can be hierarchical to the point of defining an ontology.

(3.1) Formal Concept Analysis

Figure 3:
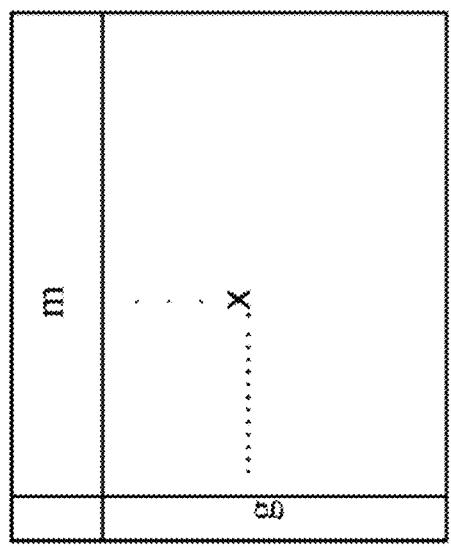
FIG. 3 illustrates a cross table showing $(g,m) \in I$ according to the principles of the present invention.

Formal concept analysis (FCA) is a principled way of deriving a concept hierarchy or formal ontology from a collection of objects and their properties or attributes. It is a creation of a partial order of the objects based on an ordering relation defined by set inclusion of attributes. Formally a context K=(G,M,I) consists of two sets G and M and a relation I, called the incidence relation, between them. The elements of G are called the objects, and the elements of M are called the attributes (as defined in Literature Reference No. 1). If an object g∈G has the attribute m∈M, then gIm or (g,m)∈I. ∈ denotes an element of. A context can be represented by a cross table, that is a rectangular table where the rows are headed by objects and the columns are headed by attributes. An X in the intersection of row g and column m means that object g has attribute m, as illustrated in FIG. 3.

Figure 4:
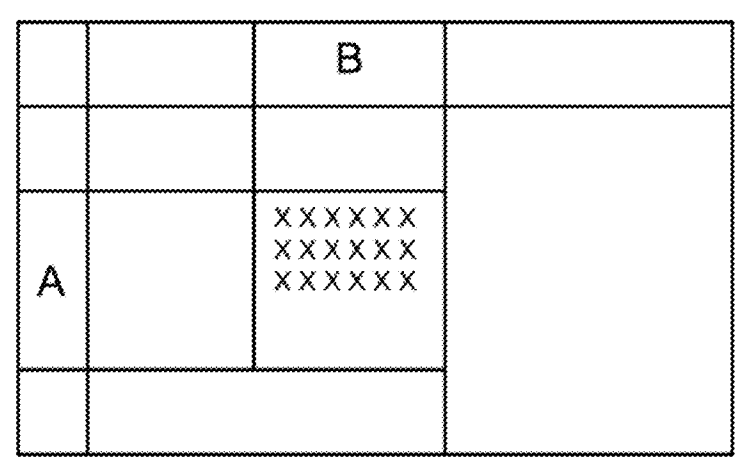

For a set $A \subseteq G$ of objects one can define $A'=\{m \in M | gIm$ for all $g \in A\}$. The symbol $\subseteq$ denotes a subset. In other words, for some subset of objects A, A' represents the set of attributes common to all the objects in A. Correspondingly, one can define $B'=\{g \in G | gIm$ for all $m \in M\}$. In other words, for some subset of attributes B, B' represents the set of objects which have all the attributes in B. One can now define a formal concept. A formal concept of the context (G, M, I) is a pair (A,B) with $A \subseteq G$, $B \subseteq M$, A'=B, and B'=A. A is called the extent, and B is called the intent of the concept (A, B). (G,M,I) denotes the set of all concepts of the context (G,M,I). A concept is represented within a cross table by a maximal contiguous block of X's after arbitrary rearrangement of rows and columns, as shown in FIG. 4. Algorithms for determining concept lattices are given in Literature Reference Nos. 1 and 2. Mathematically, the key aspect of concept lattices is that a concept lattice $\mathcal{B}$(G,M,I) is a complete lattice in which the infimum and supremum are given by:

$$\bigwedge_{t \in T}(A_t, B_t) = (\bigcap_{t \in T} A_t, (\bigcup_{t \in T} B_t)'')$$

$$\bigvee_{t \in T}(A_t, B_t) = ((\bigcup_{t \in T} A_t)'', (\bigcap_{t \in T} B_t)).$$

The supremum is called the join and is written $x \vee y$, or sometimes $\vee S$ (the join of the set S). The infimum is called the meet and is written $x \wedge y$, or sometimes $\wedge S$ (the meet of the set S). An extensive description of formal concept analysis is given in Literature Reference No. 1.

(3.2) Concept Lattices

Figure 5B:
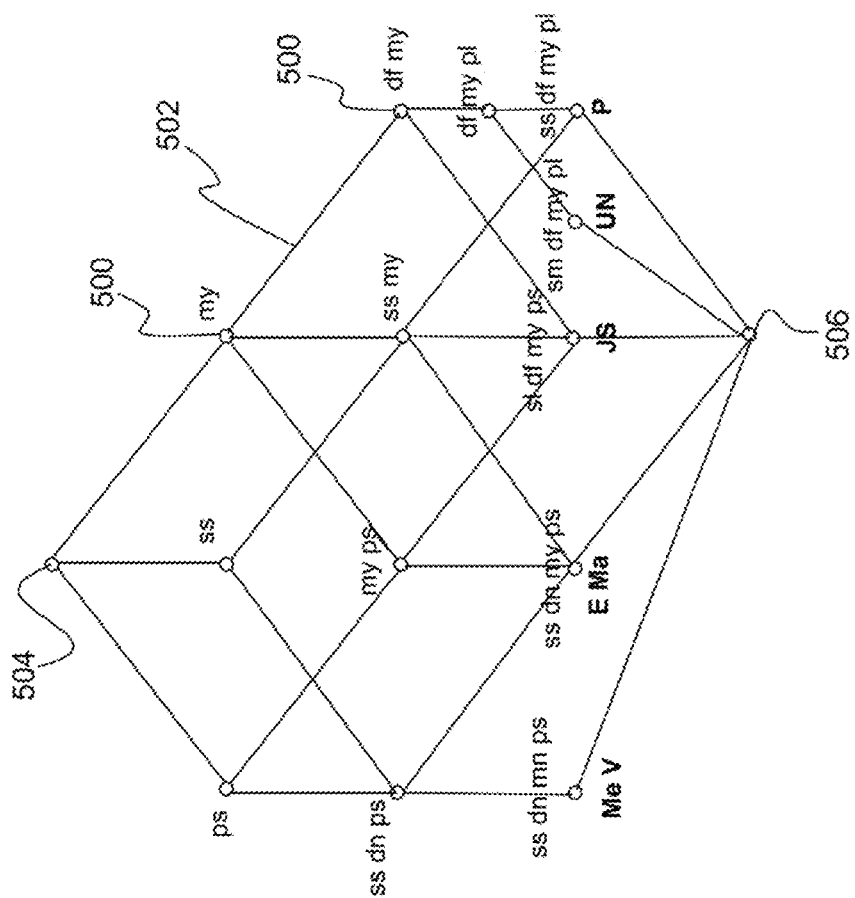
FIG. 5B illustrates a Hasse diagram corresponding to the cross table in FIG. 5A according to the principles of the present invention.

A concept lattice is a mathematical object represented by (G,M,I) as described above. A concept lattice can be visualized by a Hasse diagram, a directed acyclic graph where the nodes represent concepts, and lines represent the inclusion relationship between the nodes. In the case of formal concept analysis, the Hasse diagram has a single top node (representing all objects) and a single bottom node representing all attributes. All the nodes in between represent the various concepts comprised of some subset of objects and attributes. A line between two nodes represents the order information. The node above is considered greater than the node below. The node immediately above is said to cover the node(s) below. FIGS. 5A and 5B illustrate a context and the corresponding Hasse diagram, respectively, of the concept lattice induced by the formal context. The objects are nine planets and the attributes are properties such as size, distance to the sun, and presence or absence of moons, as shown in the table of FIG. 5A.

In the corresponding diagram depicted in FIG. 5B, nodes (as represented by circles 500) above, as connected by lines 502, represent a concept with the union of all objects and the intersection of all attributes of all the nodes connected from below. Ultimately, the top-most node 504 contains all the objects and only those attributes that all objects share (if any). Correspondingly, the bottom-most node 506 contains all the attributes and only those objects that might possess all the attributes.

(3.3) System Architecture and Function

Figure 6:
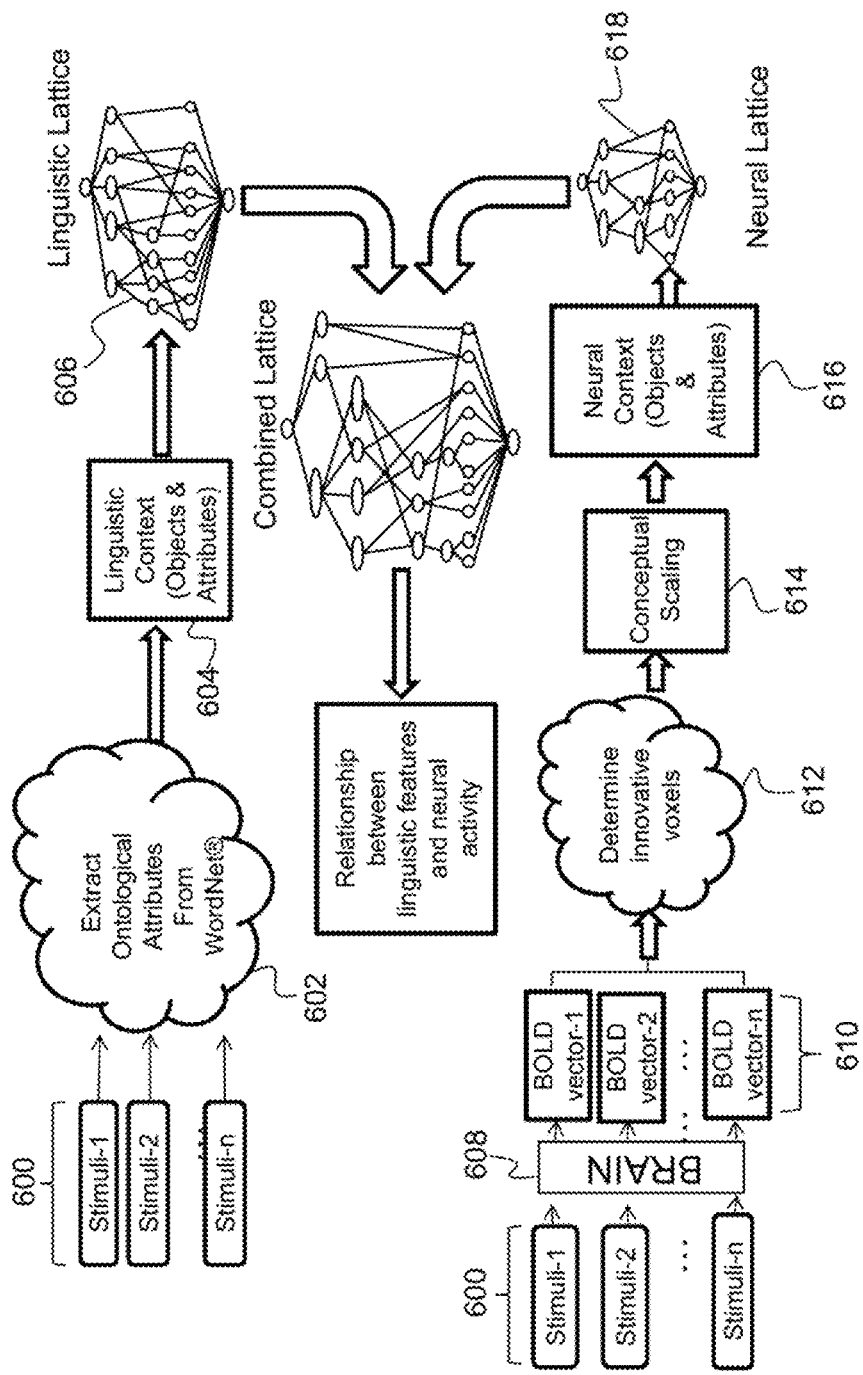
FIG. 6 illustrates the system architecture according to the principles of the present invention.

FIG. 6 is a block diagram representing an implementation of the system according to the principles of the present invention. Since the invention was reduced to practice relating a linguistic semantic domain and fMRI BOLD responses, the basic features of the architecture are described in those terms for illustrative purposes only, but the invention is not intended to be limited thereto. The basic application described is to relate semantic structure as determined by linguistics to the structure of fMRI BOLD responses to understand how the human brain represents conceptual knowledge. The goal of this application is to understand how the brain represents conceptual knowledge and use this to predict what concepts a brain is thinking from its fMRI BOLD response, or predict what form of fMRI BOLD response will be elicited by a given stimulus.

There are several ways one can measure what is going on in the brain. These include neural signals as measured by fMRI, EEG, and MEG. They each represent some form of measurement of the brain's activity. The problem is to structure this information to understand how it relates to the "subjective" conceptual understanding of the person. This can be approached in two ways. The first way is unsupervised. That is, using some form of cluster analysis to extract "grouping" of activity and see how the neural signals relate to semantic structure. The second way is to define some form of semantic structure ground truth and see what patterns in the brains activity correspond to this structure. The present invention employs formal concept analysis to extract structure in the semantic domain and the neural signal domain and bridges the domains together such that the structure of one is directly tied to the structure of the other to the degree possible.

(3.4) Linguistic Semantics

The first part of the process according to the principles of the present invention is to define the conceptual structure one is looking for within the brain. As an example and as depicted in FIG. 6, structure is defined based on linguistics, but in principle, any structure deemed as "ground truth" could be used. There are numerous ways to capture semantic structure from a set of stimuli 600 (e.g., words, sentences). One method is using statistical approaches, such as latent semantic analysis (LSA) (described in Literature Reference No. 9), or frequency of co-occurrence analyzing large text corpus, to define meaning in terms of the statistics of word context within n-grams. An n-gram is a contiguous sentence of n items from a given sequence of text or speech.

Another method is to use some form of expert derived ontology, such as within WordNet® as depicted in FIG. 6. In this step, ontological attributes are extracted from WordNet® 602. WordNet® is a large lexical database of English nouns, verbs, adjectives, and adverbs grouped into sets of cognitive synonyms (synsets), each expressing a distinct concept. Synsets are interlinked by means of conceptual-semantic and lexical relations. An additional layer of structure can be imposed to capture higher level semantics beyond the meaning of individual concepts. This includes concepts as represented by sentences decomposed by thematic relations or some other form of semantic decomposition.

The need is to extract a set of objects and a set of attributes (e.g., a linguistic context 604) defining each object from the set of stimuli 600. Once these are obtained, then a formal concept lattice (e.g., linguistic lattice 606) needs to be constructed. There are a number of algorithms existing in the literature for this (see Literature Reference No. 2 for a description of the algorithms).

(3.5) fMRI BOLD Responses fMRI BOLD responses are used to represent a level of neural activity within a region of a brain. As depicted in FIG. 6, the set of stimuli 600 (e.g., spoken words, written words, or images) are presented representing semantic or conceptual input. During this presentation the brain's 608 responses are recorded. A baseline of "null" activity is subtracted out and the difference between this neutral brain 608 state and the brain's 608 state in response to the stimuli is extracted. As in the linguistic case, the set of stimuli 600, whether individual words or sentences, represent the objects of FCA (formal concept analysis), and the extracted fMRI BOLD responses 610 for the voxels (i.e., a combination of "volume" and "pixel" representing a value on a regular grid in three-dimensional space) within the brain 608 represent the attributes of the objects. Referring to FIG. 6, from the BOLD responses 610, the system determines innovative voxels 614, followed by conceptual scaling 614 to extract neural context 616 (i.e., objects and attributes).

As in the case of linguistic semantics, a corresponding formal concept lattice (e.g., neural lattice 618) is then constructed. This process is slightly complicated by the need to binarize the attributes, which are real valued. There are numerous methods to accomplish this as described in the literature on conceptual scaling (see Literature Reference 1) 616. The end result is a formal concept lattice. In the example presented in FIG. 6, the formal concept lattice is a neural lattice 618. Because the typical number of voxels extracted from fMRI scanning is in the tens of thousands, there is a problem with scaling. Considering each voxel response is in a real valued range which must be binned into at least two ranges, current processes for constructing FCLs (formal concept lattices) are computationally too expensive to be practical. Some method of reducing the number of voxels must be employed. Additionally, this is useful since not all voxels will be informative on all stimuli.

(3.6) System Walkthrough

Figure 7B:
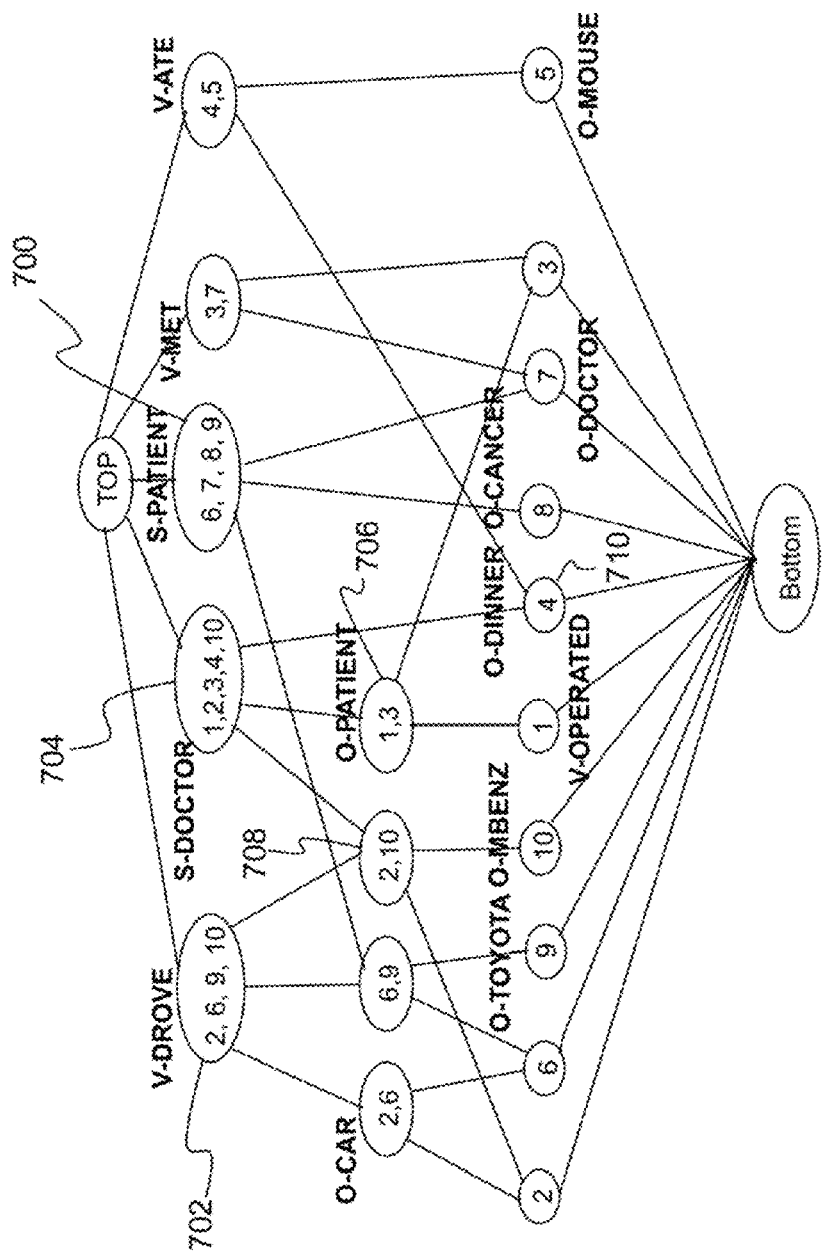
FIG. 7B illustrates a concept lattice corresponding to the linguistic context given in FIG. 7A according to the principles of the present invention.

A non-limiting example is described below to illustrate how the semantic domain and the neural signal domain can be bridged. The example is for illustration purposes only and is not meant to be limited thereto. The stimulus set is comprised of 10 simple subject-verb-object (SVO) sentences. The particular set of words as subject, verb, or object will comprise the semantic attributes. A more realistic example would decompose these words into a set of semantic/ontological attributes, such as thematic relations, LSA, and WordNet® ontology. Additionally, synonyms and n-gram co-occurrence statistics could be used as additional attributes. The stimuli for this example are:

S1=The doctor operated on the patient
S2=The doctor drove the car
S3=The doctor met the patient
S4=The doctor ate dinner
S5=The cat ate a mouse
S6=The patient drove the car
S7=The patient met the doctor
S8=The patient has cancer
S9=The patient drove a toyota
S10=The doctor drove a mbenz The context for the linguistic domain is given in the table in FIG. 7A, and the corresponding concept lattice is illustrated in FIG. 7B. The numbers in the nodes (represented by circles) in FIG. 7B correspond to the sentence (S) number in the table in FIG. 7A. An attribute listed beside a node (e.g., O-CAR) indicates that that attribute is present in that and all nodes below. For simplicity, the attributes used correspond to syntactic properties of the stimuli and, consequently, the groupings in the linguistic lattice are syntactic groupings.

The node labeled {6,7,8,9} (element 700) corresponds to having a "patient" as a subject; the node labeled {2,6,9,10} (element 702) corresponds to having "drove" as the verb. The node labeled {1,2,3,4,10} (element 704) corresponds to the "doctor" doing something. This node covers node {1,3} (element 706) of the "doctor" doing something to the "patient", node {2,10} (element 708) of the doctor driving something, and node {4} (element 710) of the doctor eating dinner. If there were more cases of the doctor eating something else, they would also be included within this node. The point is that an ontological hierarchy (in this case based on syntactic structure) is created by the FCA process and displayed in the Hasse diagram shown in FIG. 7B. A more complex example could use semantic based attributes.

Figure 8B:
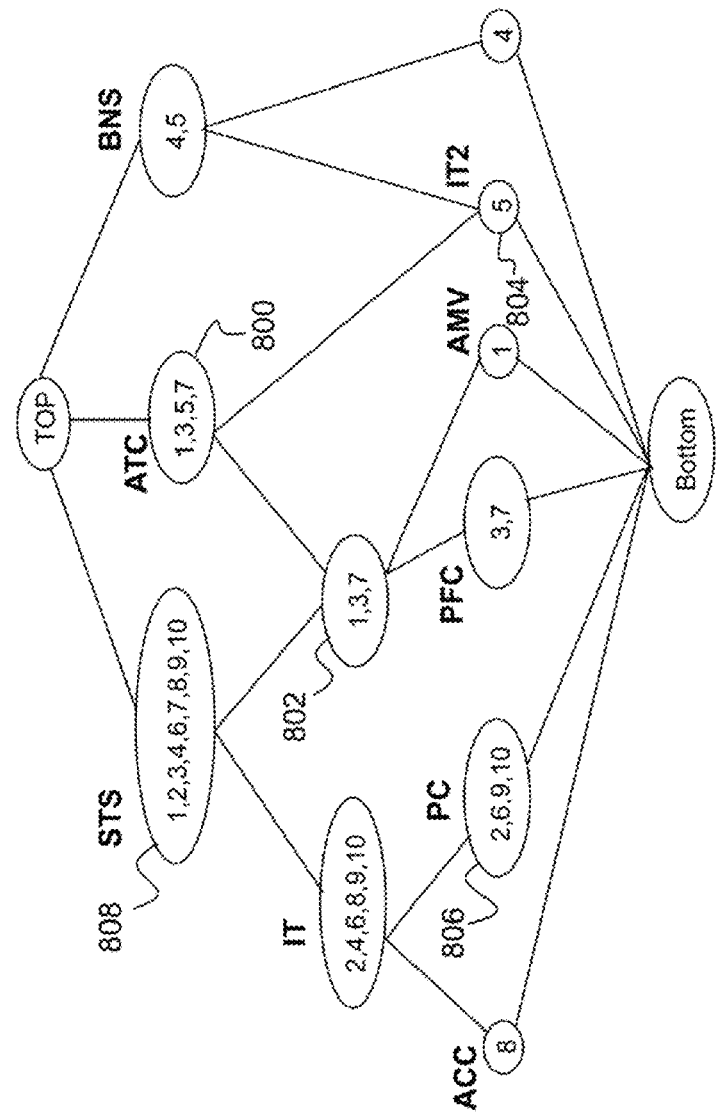
FIG. 8B illustrates a concept lattice corresponding to the neural context given in FIG. 8A according to the principles of the present invention.

The context for the neural domain is given in the table in FIG. 8A, and the corresponding concept lattice is illustrated in FIG. 8B, where the numbers in the nodes in FIG. 8B correspond to the sentence (S) number in the table in FIG. 8A. In this non-limiting example, activity in nine brain areas comprises the attributes. Responses in these areas for the given stimulus are hypothetical. In this example, the columns (representing attributes) in the table in FIG. 8A are labeled as brain regions; however, for the purposes of the present invention, the columns are any neural data channels. For instance, they can be the voxels in a fMRI volume for which the data represented is time locked to the stimulus. Data channels, such as EEG channels or source data, are also possible. Furthermore, higher order processed information, such as phase, frequency, or correlations, can serve as columns (i.e., attributes) as well.

In a similar way, the concept lattice derived from neural based attributes, such as the one depicted in FIG. 8B, exposes the ontological structure in the neural domain. That is, node {1,3,5,7} (element 800) are all the stimuli where the ATC (anterior temporal cortex) is active. It covers node {1,3,7} (element 802) where the ATC and STS (superior temporal sulcus) are active, and node {5} (element 804) where the ATC, BNS (brainstem neuromodulatory system), and IT2 (inferior temporal) are active.

Figure 9:
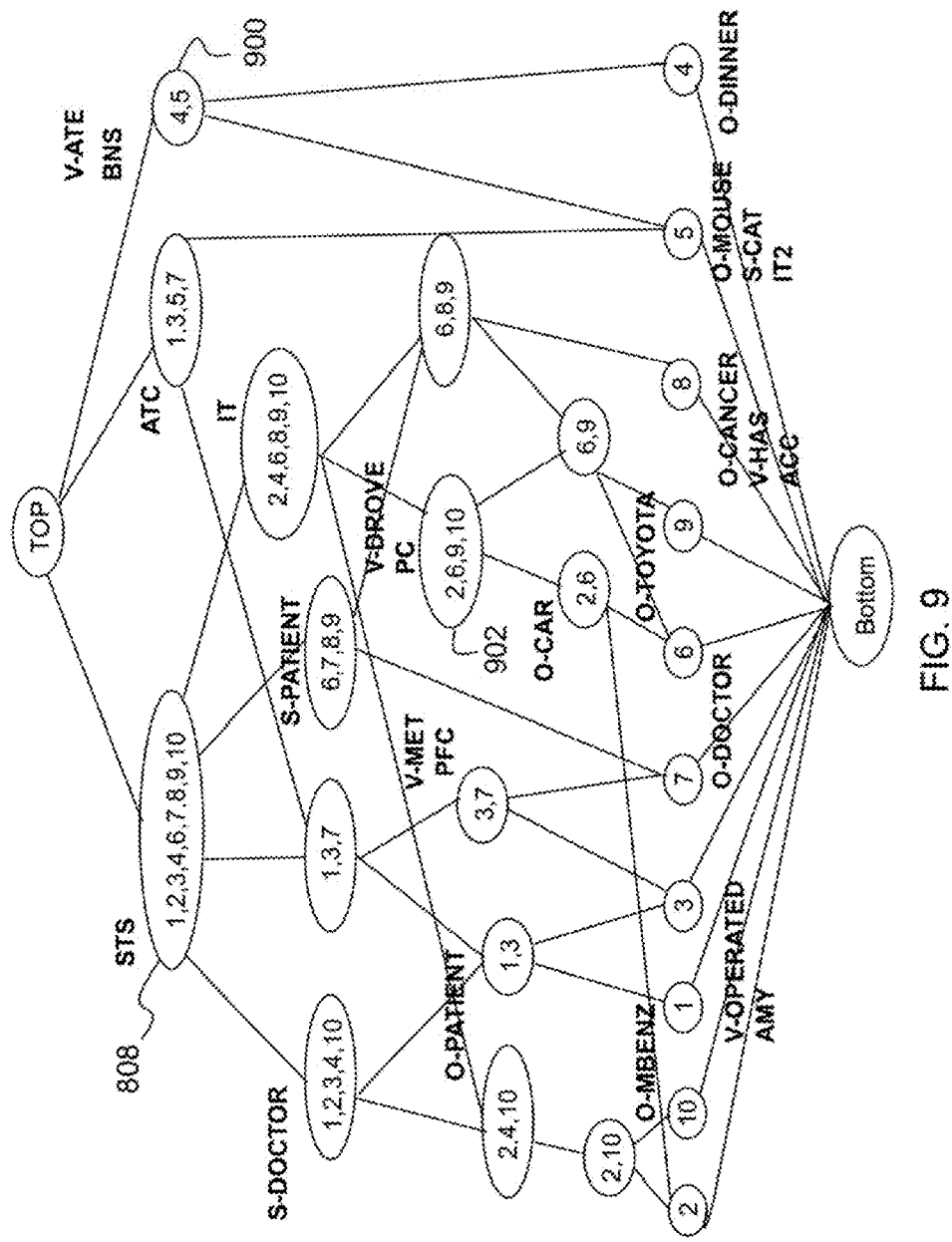
FIG. 9 illustrates a concept lattice of the combined neural and linguistic domains according to the principles of the present invention.

Finally, the combined concept lattice using lattice apposition (see Literature Reference No. 1 for a description of lattice apposition) is shown in FIG. 9. The combined lattice (because of the common set of stimuli) links together linguistic attributes and neural attributes. The correspondence can be directly read from the attribute sets in the combined lattice. In the case of the combined lattice depicted in FIG. 9, two of the nodes have an exact correspondence between the linguistic and neural lattices. Node {4,5} (element 900), common to both lattices, means that BNS activity corresponds to the action of eating, and node {2,6,9,10} (element 902) common to both means that driving corresponds to activity in IT, PC (parietal cortex), and STS. Note that the combined lattice depicted in FIG. 9 has more nodes than either the neural or linguistic lattices depicted in FIGS. 7B and 8B, respectively. If the combined lattice (FIG. 9) had exactly the same number of nodes as both the neural and linguistic lattices (FIGS. 7B and 8B), that would imply that both the neural and linguistic lattices have the exact same structure. The smaller the increase in size of the combined lattice, the more similar the structure of the domains and the more direct mapping that exists between the attributes of each.

The value of using the alignment of lattices technique over more traditional methods of understanding voxel correlations is that with the lattice technique one also gets correspondences within a hierarchy. In the example described herein, the node for {S2,S6,S9,S10} (element 902 in FIG. 9) is an instance of this. PC activity corresponds to driving. Another example would be if the stimuli consisted of concepts of objects, such as dog, cat, monkey, hammer, and screwdriver. In this case, one would seek neural attributes that, in addition to mapping onto the individual stimuli, would also map onto the hierarchical (ontological) structure. Presumably, within the semantic lattice there would be a node for animals and also for tools. Although these categories are not part of the stimulus set, they are part of its semantic structure and it might be validating to find neural correlates of these higher level abstractions as well as for the actual stimuli.

Compared to the example described above, a real fMRI data set would have many more voxels and, consequently, many more nodes that both exactly coincide for the two lattices and that don't. Using the entire fMRI dataset would find all these exact correspondences. Depending on the number of stimuli, number of neural attributes, and the number of semantic attributes, running the FCA algorithm on the entire dataset may be computationally infeasible. Running time of the algorithm is $O(|C||M|(|G|+|M|))$ where $|C|$ is the number of concepts, $|M|$ is the number of objects, and $|G|$ is the number of attributes.

However, there is also an incremental version which allows an object and its attributes to be added to or deleted from the concept lattice one at a time. In this case, a much smaller set of neural attributes can be used, then the lattice refined incrementally. Attributes (voxel responses), which increase the size of the joint/combined lattice, are rejected, and attributes which do not increase the size of the joint/combined lattice (or only a small amount) are kept. Since nearby voxels tend to correlate, it is useful to use fewer but larger ROI (region of interest) responses as the initial set of attributes. These ROIs can then be split according to that which decreases the combined lattice size. The following example illustrates this.

Figure 10:
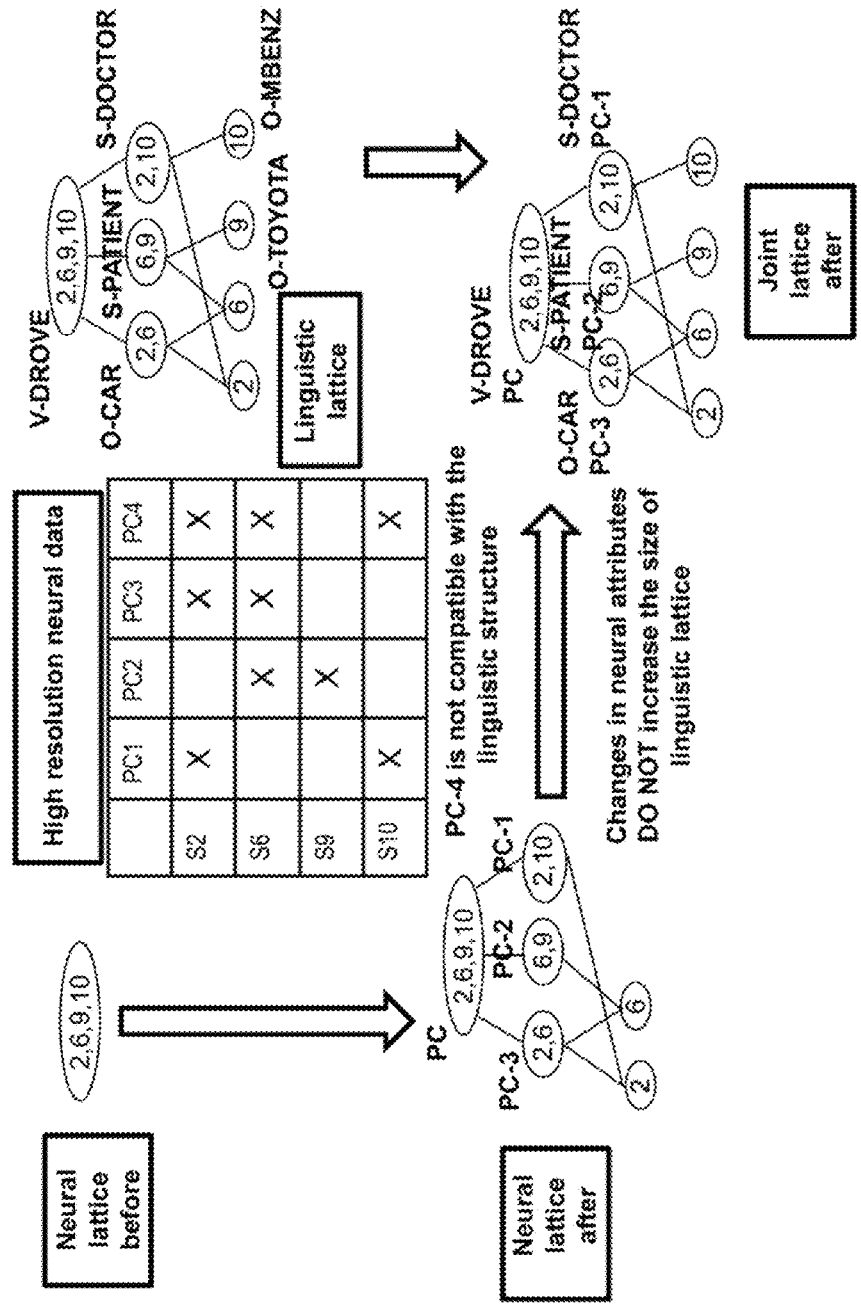
FIG. 10 illustrates improvement of a concept lattice according to the principles of the present invention.

A look at the node for {S2, S6, S9, S10} (element 806) in the neural lattice in FIG. 8B shows that these stimuli are not discriminated by the neural activity as they are all in the same node. However, this ROI shows a lot of PC activity as expressed in the high resolution neural data table in FIG. 10. Entities that only exist within the same node {S2, S6, S9, S10} (element 806) indicate that there are no attributes (in this case neural activity attributes) that differentiate them. The goal is to look at the PC activity in more detail to see if sub-sections discriminate {S2, S6, S9, S10} (element 702) according to the structure within the linguistic lattice in FIG. 7B. According to the linguistic lattice, PC activity corresponds to various forms of driving. Are there sub-regions that discriminate between these? As illustrated in FIG. 10, formal concept analysis of the activity within the PC shows that PC1, PC2, and PC3 help capture the structure of the linguistic data, whereas PC4 does not.

The original neural data did not distinguish the sentences {S2, S6, S9, S10}. Using higher resolution neural data (getting data from four sub-regions within the PC), as shown in the corresponding section of the neural context table in FIG. 8A, a more detailed neural lattice is formed where having more fine scaled attributes now differentiates sentences {S2, S6, S9, S10}. This was done by rebuilding the neural lattice using the attentional attributes PC, PC2, PC3 which create a lattice shape isomorphic to that of the linguistic lattice. If PC4 was also included, an additional node grouping together {S2,S6,S10} would have appeared which is not compatible with linguistic structure; therefore, it was excluded. A similar analysis can help look for neural attributes that help differentiate the linguistics within node {S3, S7}.

Figure 11:
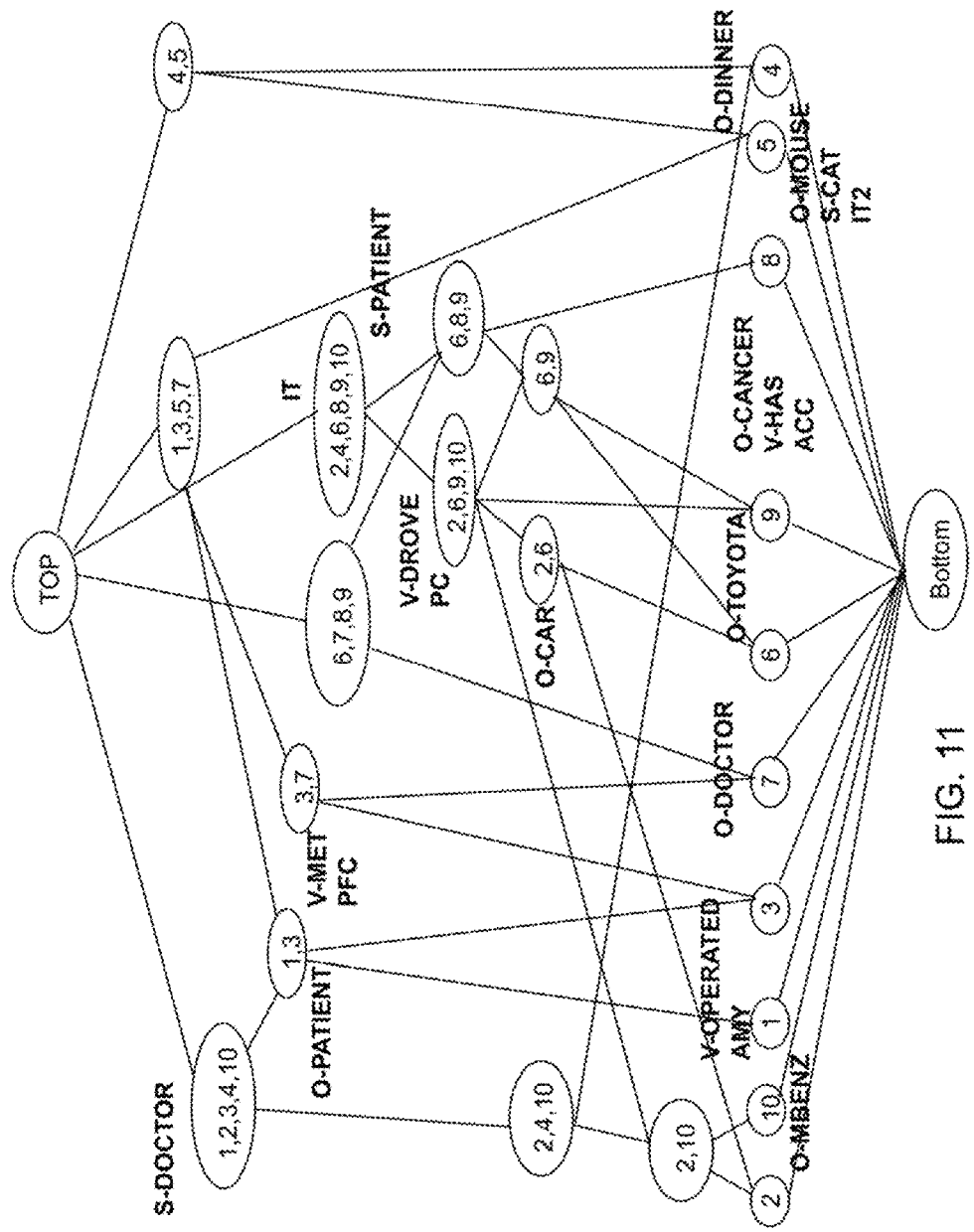
FIG. 11 illustrates a combined lattice without STS activity according to the principles of the present invention.

In addition, any node which is in the neural lattice, but not in the linguistic is likely to be noise or uninformative, and any neural attributes introduced by those nodes are candidates for removal. An example of this is node {1, 2, 3, 4, 6, 7, 8, 9, 10} (element 808 in FIG. 8B and FIG. 9), which introduces STS as a neural attribute. This node is not in the linguistic lattice (shown in FIG. 7B), and STS activity is not informative to linguistic structure. FIG. 11 illustrates the combined lattice with STS as a neural attribute removed. As a consequence of removing STS, two nodes ({1, 2, 3, 4, 6, 7, 8, 9, 10} and {S1, S3, S7}) are no longer in the combined lattice. This new lattice, depicted in FIG. 11, has 25 nodes instead of 27 nodes without any difference in the correspondence between neural and linguistic attributes.

Another approach to incrementally building the lattice is to use some other technique to find potentially informative voxels, such as regression analysis, machine learning, or some form of rank indexing based on the voxels ability to separate stimuli. Potentially good voxels are added and if they don't increase the lattice size, they are considered voxels whose activities are compatible with the linguistic semantic structure and should be kept. If they grossly increase the lattice size, they are considered voxels whose activity is noise with respect to the linguistic semantic structure. With this method, aligning the two lattices can be used to help validate voxel selection by any other technique.

(3.7) Addition of Logic

In a realistic application of the present invention, the resulting combined lattice can have hundreds of thousands of concept nodes. Many logical relationships between attributes are implicit in the lattice. It is useful to find attributes from one domain which imply the presence of attributes from the other domain(s). These implications compactly encapsulate the linking between the two domains. By leveraging the logical structure of the concept lattice, all possible logical implications can be found by using algorithms disclosed in Literature Reference No. 2.

Along with the addition of structure by constructing the combined lattice, logical predicates on attributes can be inferred. This comes from the organizing principal of the lattice. The attributes of the join concept are the intersection of all the attributes of all the concepts covered by the join concept. In other words, the join concept is the AND of all the concepts covered by it. Dually, the attributes of the meet concept are the union of all the attributes of all the concepts which cover the meet concept, or in other words, the meet concept is the OR of all the concepts which cover it. In addition to AND OR, there exists a NOT relationship implicit within the concept lattice. The NOT of a concept is constructed via the notion of complements. Two nodes, a and b, are complements if their join is the TOP node and their meet is the BOTTOM node. Then NOT(a) is equal to a's complement (a node b such that a $\vee$ b=I (or TOP) and a $\wedge$ b=0 (or BOTTOM). With these logical operations, it now becomes possible to read off implications, equivalence, nand, nor, or any other logical relationship from the concept lattice. A→B is defined as $\neg A \vee B$. The table in FIG. 12 shows some of the logical implications derivable from the concept lattice. In this way, the system according to the principles of the present invention can make predictions not only about stimuli, but also about hierarchical abstractions of stimuli in either direction. An exhaustive application of the find-implications algorithm (see Literature Reference No. 2) will find all such implications.

Figure 13:
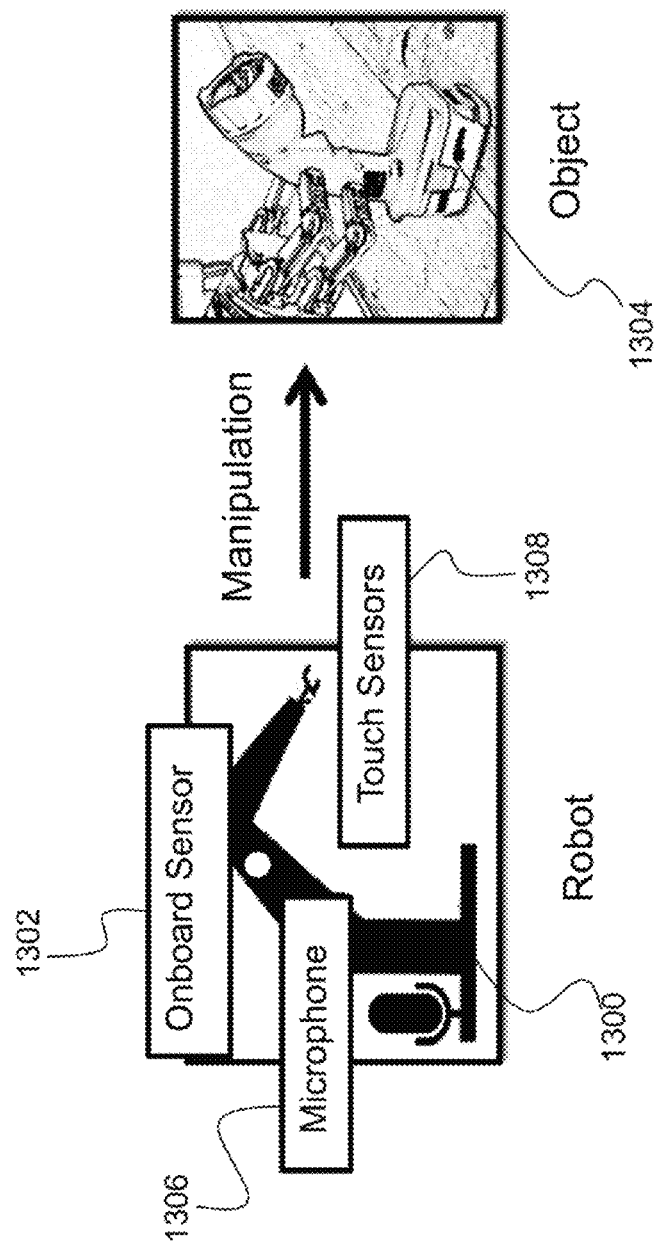
FIG. 13 is an illustration of an autonomous robot according to the principles of the present invention.

FIG. 13 is an illustration of an autonomous robot 1300 incorporating capabilities according to the principles of the present invention in a processor 100. The autonomous robot 1300 comprises an at least one onboard sensor 1302, wherein the at least one onboard sensor 1302 is operable for sensing a set of objects 1304 in a current environment or domain. Non-limiting examples of the at least one onboard sensor 1302 may include a camera, a video camera, a thermal imaging sensor, and an infrared sensor. Furthermore, the autonomous robot 1300 may include additional sensors including, but not limited to, a microphone 1306 and touch sensors 1308. Additionally, the autonomous robot 1300 may comprise a plurality of actuators (e.g., motors, tactile actuators) for selecting a salient object 1304 in the current environment, such as for manipulation, or for causing the autonomous robot 1300 to move (e.g., turning wheels, rotors, etc.).

What is claimed is:

1. A system for extracting conceptual knowledge representation from neural systems, the system comprising:
   one or more processors and a non-transitory computer-readable medium having executable instructions encoded thereon such that when executed, the one or more processors perform operations of:
   extracting a first set of attributes to define a set of objects in a first domain;
   constructing a first formal concept lattice comprising the set of objects and the first set of attributes from the first domain;
   extracting a second set of attributes to define the set of objects in a second domain;
   constructing a second formal concept lattice comprising the set of objects and the second set of attributes from the second domain;
   aligning the first formal concept lattice with the second formal concept lattice using lattice apposition to link the first set of attributes with the second set of attributes, wherein a combined lattice is generated; and
   using the combined lattice to relate the first domain to the second domain.

2. The system as set forth in claim 1, wherein the set of objects is presented to a human subject as a set of stimuli, and a set of neural signals from the human subject is measured during the presentation of the set of objects, wherein the set of neural signals represents the second set of attributes.

3. The system as set forth in claim 2, wherein the first domain is a semantic domain and the second domain is a neural domain.

4. The system as set forth in claim 3, wherein the one or more processors further perform an operation of defining the set of objects in the neural domain using a definition of the set of objects in the semantic domain.

5. The system as set forth in claim 4, wherein the one or more processors further perform an operation of using the combined lattice to denoise at least one attribute in the first or second sets of attributes, wherein the at least one attribute is a candidate for removal if it is found in one of the first or second formal concept lattices but not the other formal concept lattice.

6. The system as set forth in claim 1, wherein the one or more processors further perform an operation of using the combined lattice to denoise at least one attribute in the first or second sets of attributes, wherein the at least one attribute is a candidate for removal if it is found in one of the first or second formal concept lattices but not the other formal concept lattice.

7. A computer-implemented method for extracting conceptual knowledge representation from neural systems, comprising an act of:
   causing one or more processors to execute instructions stored on a non-transitory memory such that upon execution, the one or more processors perform operations of:

extracting a first set of attributes to define a set of objects in a first domain;

constructing a first formal concept lattice comprising the set of objects and the first set of attributes from the first domain;

extracting a second set of attributes to define the set of objects in a second domain;

constructing a second formal concept lattice comprising the set of objects and the second set of attributes from the second domain;

aligning the first formal concept lattice with the second formal concept lattice using lattice apposition to link the first set of attributes with the second set of attributes, wherein a combined lattice is generated; and using the combined lattice to relate the first domain to the second domain.

8. The method as set forth in claim 7, wherein the set of objects is presented to a human subject as a set of stimuli, and a set of neural signals from the human subject is measured during the presentation of the set of objects, wherein the set of neural signals represents the second set of attributes.

9. The method as set forth in claim 8, wherein the first domain is a semantic domain and the second domain is a neural domain.

10. The method as set forth in claim 9, wherein the one or more processors further perform an operation of defining the set of objects in the neural domain using a definition of the set of objects in the semantic domain.

11. The method as set forth in claim 10, wherein the one or more processors further perform an operation of using the combined lattice to denoise at least one attribute in the first or second sets of attributes, wherein the at least one attribute is a candidate for removal if it is found in one of the first or second formal concept lattices but not the other formal concept lattice.

12. The method as set forth in claim 7, wherein the one or more processors further perform an operation of using the combined lattice to denoise at least one attribute in the first or second sets of attributes, wherein the at least one attribute is a candidate for removal if it is found in one of the first or second formal concept lattices but not the other formal concept lattice.

13. A computer program product for extracting conceptual knowledge representation from neural systems, the computer program product comprising computer-readable instructions stored on a non-transitory computer-readable medium that are executable by a computer having a processor for causing the processor to perform operations of:

extracting a first set of attributes to define a set of objects in a first domain;

constructing a first formal concept lattice comprising the set of objects and the first set of attributes from the first domain;

extracting a second set of attributes to define the set of objects in a second domain;

constructing a second formal concept lattice comprising the set of objects and the second set of attributes from the second domain;

aligning the first formal concept lattice with the second formal concept lattice using lattice apposition to link the first set of attributes with the second set of attributes, wherein a combined lattice is generated; and using the combined lattice to relate the first domain to the second domain.

14. The computer program product as set forth in claim 13, wherein the set of objects is presented to a human subject as a set of stimuli, and a set of neural signals from the human subject is measured during the presentation of the set of objects, wherein the set of neural signals represents the second set of attributes.

15. The computer program product as set forth in claim 14, wherein the first domain is a semantic domain and the second domain is a neural domain.

16. The computer program product as set forth in claim 15, further comprising instructions for causing the processor to perform an operation of defining the set of objects in the neural domain using a definition of the set of objects in the semantic domain.

17. The computer program product as set forth in claim 16, further comprising instructions for causing the processor to perform an operation of using the combined lattice to denoise at least one attribute in the first or second sets of attributes, wherein the at least one attribute is a candidate for removal if it is found in one of the first or second formal concept lattices but not the other formal concept lattice.

18. The computer program product as set forth in claim 13, further comprising instructions for causing the processor to perform an operation of using the combined lattice to denoise at least one attribute in the first or second sets of attributes, wherein the at least one attribute is a candidate for removal if it is found in one of the first or second formal concept lattices but not the other formal concept lattice.

19. An autonomous robot for extracting conceptual knowledge representation from neural systems, the autonomous robot comprising:

at least one onboard sensor, the at least one onboard sensor operable for sensing a set of objects in at least one domain; and one or more processors and a non-transitory computer-readable medium having executable instructions encoded thereon such that when executed, the one or more processors perform operations of:

extracting a first set of attributes to define a set of objects in a first domain;

constructing a first formal concept lattice comprising the set of objects and the first set of attributes from the first domain;

extracting a second set of attributes to define the set of objects in a second domain;

constructing a second formal concept lattice comprising the set of objects and the second set of attributes from the second domain;

aligning the first formal concept lattice with the second formal concept lattice using lattice apposition to link the first set of attributes with the second set of attributes, wherein a combined lattice is generated; and using the combined lattice to relate the first domain to the second domain.

* * * * *